(12) United States Patent
Di Giacomo et al.

(10) Patent No.: US 7,918,758 B2
(45) Date of Patent: Apr. 5, 2011

(54) DRIVE ASSEMBLY FOR DRIVING A ROTARY MEMBER, IN PARTICULAR A COMBUSTION ENGINE WATER PUMP SHAFT

(75) Inventors: Tommaso Di Giacomo, Chieti Scalo (IT); Heinz Lemberger, Unterföhring (DE)

(73) Assignee: Dayco Europe S.R.L., Munich (DE)

( * ) Notice: Subject to any disclaimer, the term of this patent is extended or adjusted under 35 U.S.C. 154(b) by 956 days.

(21) Appl. No.: 10/551,089

(22) PCT Filed: Apr. 1, 2004

(86) PCT No.: PCT/EP2004/050421
§ 371 (c)(1),
(2), (4) Date: Dec. 27, 2006

(87) PCT Pub. No.: WO2004/088169
PCT Pub. Date: Oct. 14, 2004

(65) Prior Publication Data
US 2007/0137593 A1    Jun. 21, 2007

(30) Foreign Application Priority Data
Apr. 2, 2003 (EP) .................................... 03425204

(51) Int. Cl.
*F16H 13/00* (2006.01)
(52) U.S. Cl. ................ 476/66; 476/48; 476/28; 74/354; 474/58; 474/118; 474/135
(58) Field of Classification Search .......... 474/110–120, 474/135, 133, 134, 103, 104, 109, 94, 101, 474/139, 148–150; 123/90–99, 195 C, 198 R; 74/11, 13, 352–354; 415/5; 417/174, 223; 16/238, 240, 242; 105/253; 476/65, 66, 28, 48

See application file for complete search history.

(56) References Cited

U.S. PATENT DOCUMENTS

| 1,289,818 | A |   | 12/1918 | Kurkjian |
| 1,416,569 | A | * | 5/1922  | Minnich ......................... 476/65 |
| 1,591,978 | A |   | 5/1924  | Hosking et al. |
| 2,823,546 | A |   | 2/1958  | Barrett |
| 3,157,132 | A | * | 11/1964 | Floehr .......................... 105/253 |
| 3,187,674 | A | * | 6/1965  | Hammelmann ............... 417/223 |

(Continued)

FOREIGN PATENT DOCUMENTS

DE        354 907 C       6/1922

(Continued)

OTHER PUBLICATIONS

Robert L. Norton, Machine Design an Integrated Approach, 1996, Prentice Hall, p. 720-722.*

*Primary Examiner* — Robert A Siconolfi
*Assistant Examiner* — Anna Momper

(57) ABSTRACT

In a drive assembly for driving a pulley of a water pump of a combustion engine, a movable supporting arm is fitted idly with a drive wheel, and is loaded by a torsion spring to bring the drive wheel into angular engagement with the pulley fitted to the shaft of the pump, and with a drive belt of the engine; an actuating device (being activatable to exert a force in opposition to that exerted by the torsion spring, and detach the drive wheel from the pulley.

11 Claims, 5 Drawing Sheets

U.S. PATENT DOCUMENTS

| | | | | |
|---|---|---|---|---|
| 3,534,923 A * | 10/1970 | Wakabayashi | 242/356.4 |
| 3,550,463 A * | 12/1970 | Halls | 474/119 |
| 3,587,336 A * | 6/1971 | Peak | 474/89 |
| 3,730,037 A * | 5/1973 | Purrer | 83/68 |
| 4,822,321 A * | 4/1989 | Webb | 474/117 |
| 4,861,321 A * | 8/1989 | Siegwart, Jr. | 474/133 |
| 4,938,665 A * | 7/1990 | Volkmann | 417/174 |
| 5,967,919 A * | 10/1999 | Bakker | 474/94 |
| 6,396,173 B1 * | 5/2002 | Prampolini | 310/12 |
| 6,953,407 B2 * | 10/2005 | Kitamura et al. | 474/135 |
| 2002/0183149 A1 * | 12/2002 | Temma et al. | 474/133 |
| 2003/0083164 A1 * | 5/2003 | MacNaughton et al. | 474/135 |

FOREIGN PATENT DOCUMENTS

| | | |
|---|---|---|
| DE | 39 34 884 A1 | 4/1991 |
| DE | 199 14 440 A1 | 10/2000 |
| EP | 1 455 064 A2 | 9/2004 |
| JP | 63151520 A * | 6/1988 |
| JP | 2000 018344 | 1/2000 |
| JP | 2001 130779 | 5/2001 |
| JP | 2003 027942 | 1/2003 |
| WO | WO 2004/048758 A1 | 6/2004 |
| WO | WO 2004/048808 A1 | 6/2004 |
| WO | WO 2004/048809 A1 | 6/2004 |
| WO | WO 2004/079225 A1 | 9/2004 |

* cited by examiner

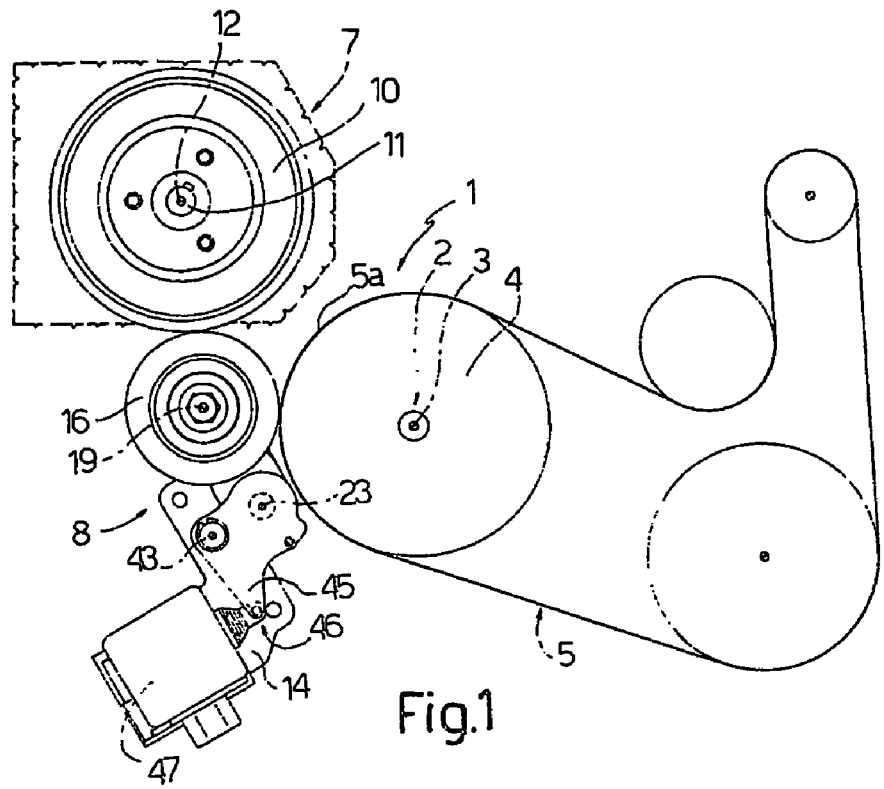
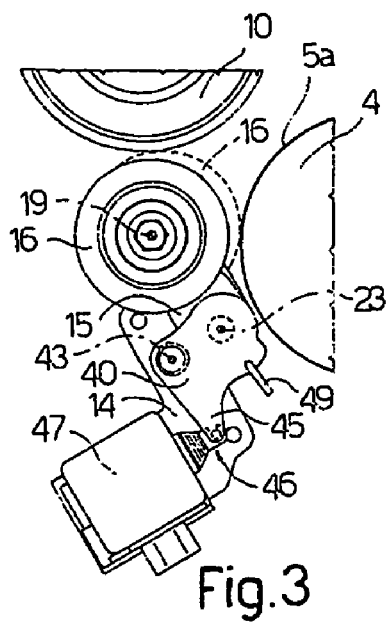
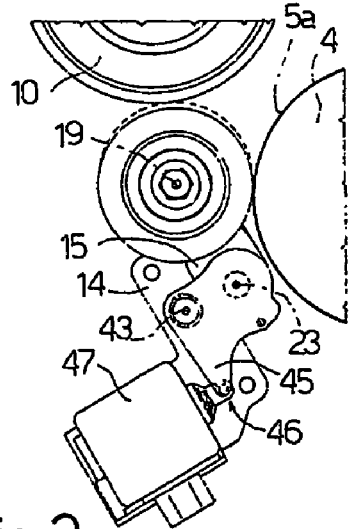
Fig.1
Fig.3  Fig.2

DRIVE ASSEMBLY FOR DRIVING A ROTARY MEMBER, IN PARTICULAR A COMBUSTION ENGINE WATER PUMP SHAFT

TECHNICAL FIELD

The present invention relates to a drive assembly for driving a rotary member, in particular a combustion engine water pump shaft.

BACKGROUND ART

To control the temperature of combustion engines, to which the following description refers purely by way of example, cooling circuits are used in which a cooling fluid, normally water, is circulated by a rotary pump. As is known, the pump is operated by the combustion engine itself via a mechanical belt drive, in which a flexible belt is looped about the pulleys fitted to the drive shaft and the pump shaft. The pump is therefore operated continuously by the engine, and continuously circulates cooling fluid, even when the engine is started up and the temperature of the engine is gradually rising to the optimum running level. Prior to reaching running temperature, however, the engine does not operate at its best, and pollutant emissions are normally high, so that circulating cooling water at this time increases the time taken to reach running temperature and, consequently, the amount of pollutant emissions produced.

DISCLOSURE OF INVENTION

It is an object of the present invention to provide a drive assembly for driving a rotary member, and which provides a straightforward, low-cost solution to the above problem, in particular, by operating the pump independently of the operating mode of the engine, while at the same time ensuring safe engine operating conditions.

According to the present invention, there is provided a drive assembly for driving a rotary member, in particular the shaft of a pump of a combustion engine; the assembly being characterized by comprising a movable supporting member; a drive wheel fitted idly to said movable supporting member; elastic means for moving said movable supporting member, so that said drive wheel angularly engages said rotary member and a drive member, powered by said combustion engine, to drive the rotary member; and actuating means which can be activated to exert a force in opposition to that exerted by said elastic means, to detach said drive wheel from at least one of said rotary member and said drive member.

In the assembly defined above, said elastic means preferably exert a force, to push said drive wheel against said rotary member and said drive member, which is greater than the travel resistance of said actuating means when maintained in a disabled rest condition.

BRIEF DESCRIPTION OF THE DRAWINGS

A number of non-limiting embodiments of the invention will be described by way of example with reference to the accompanying drawings, in which:

FIG. 1 shows a schematic side view of a combustion engine, in which a water pump is driven by a first preferred embodiment of the drive assembly according to the present invention;

FIGS. 2 and 3 show the FIG. 1 drive assembly in two different operating positions;

BEST MODE FOR CARRYING OUT THE INVENTION

Figure 4:
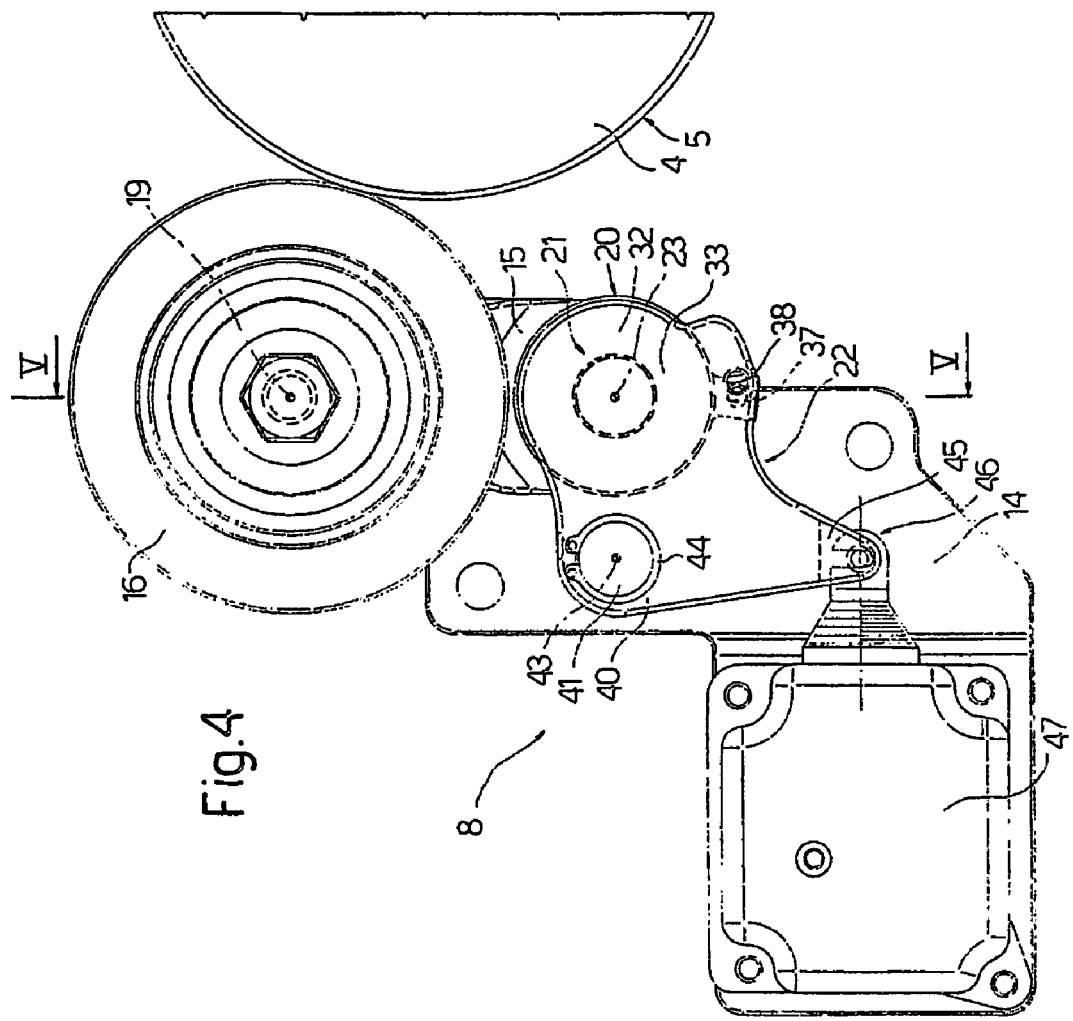
FIG. 4 shows a larger-scale detail of FIG. 1.

Number 1 in FIG. 1 indicates as a whole a combustion engine, an output shaft 2 of which, rotating about an axis 3, is fitted with a drive pulley 4, about which is looped an endless drive belt 5 for driving one or more auxiliary members.

Engine 1 is cooled by a water cooling circuit comprising a pump 7, which, in the example described, is driven by belt 5 via a drive assembly 8 interposed between belt 5 and a pulley 10 fitted to the shaft 11 of pump 7 to rotate about an axis 12 parallel to axis 3, and covered externally with a layer of soft material.

Figure 10:
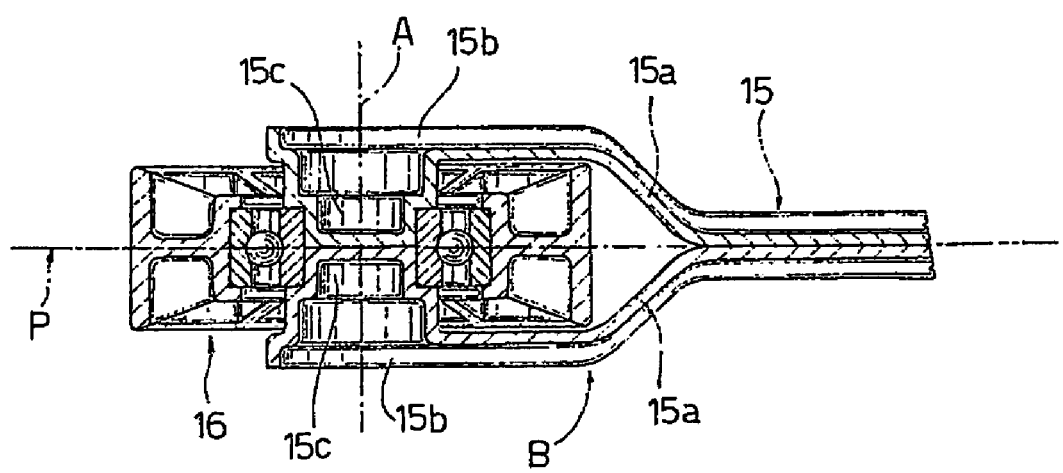
FIG. 10 shows a section of a variation of a detail in FIG. 5.

Assembly 8 permits disconnection of pump 7 from belt 5, and comprises a fixed supporting frame 14—in the example shown, a plate type; a movable support member or arm 15 made of molded plastic material and movable with respect to axes 3 and 12; and a drive wheel 16 fitted idly to an end portion 18 (FIG. 5) of arm 15 to rotate about an axis 19 parallel to axes 3 and 12. In the FIG. 10 variation, arm 15 is symmetrical with respect to a longitudinal plane P, and comprises two contoured portions 15a of the same shape and size and made of molded plastic material. Portions 15a face and contact each other on opposite sides of the plane P of symmetry of arm 15 and of wheel 16, perpendicular to the axis A of rotation of wheel 16, and are connected integrally to each other, e.g. welded, riveted, or by other equivalent joining means, to define a fork-shaped end portion B to which drive wheel 16 is hinged. Fork-shaped portion B has two arms 15b, each of which is fitted integrally with a variable-diameter cylindrical projection 15c, which, when portions 15a are connected, extends towards the other projection 15c, coaxially with axis A, to define, together with the other projection 15a, a hinge pin to which wheel 16 is mounted to rotate about axis A with the interposition of a rolling-contact bearing. Wheel 16 is conveniently made of plastic material, and is defined circumferentially by a sculpted convex surface to assist drainage of any water between the wheel and belt. A tubular connecting portion 20 of arm 15, opposite the end portion 18, is hinged to a portion 21 of a substantially L-shaped rocker arm lever 22 to rotate, with respect to lever 22, about an axis 23 parallel to axis 19 and coincident with an axis of symmetry of tubular portion 20.

Figure 5:
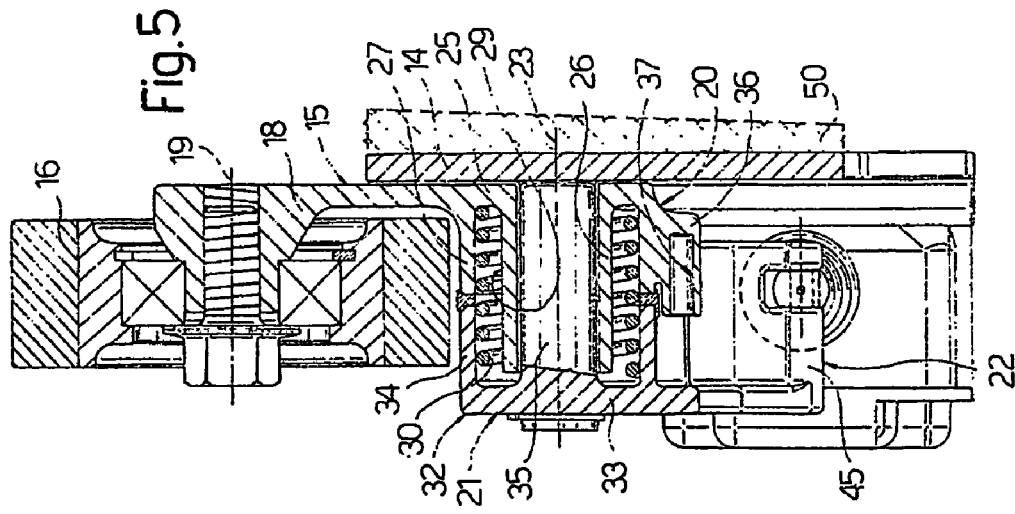
FIG. 5 shows a section along line V-V in FIG. 4.

As shown, particularly in FIG. 5, connecting portion 20 comprises an annular end wall 25; and two cylindrical tubular walls 26 and 27, which extend from annular end wall 25, coaxially with axis 23, are located one inside the other, and are of different lengths. In particular, inner tubular wall 26 is longer than tubular wall 27. Together with annular end wall 25, tubular walls 26 and 27 define an annular cavity 29 housing a wire torsion spring 30, one end of which is connected in known and angularly fixed manner to portion 20, and the opposite end of which is connected in angularly fixed manner to portion 21 of lever 22. Conveniently, the opposite ends of spring 30 rest on respective shoulders integral with respective portions 20 and 21, or are inserted inside respective radial openings formed in portions 20 and 21.

As shown in FIG. 5, portion 21 of lever 22 comprises a cup-shaped cover body 32, in turn comprising an end wall 33 facing wall 25 and spring 30; and a cylindrical wall 34, which extends towards wall 27, coaxially with axis 23, and is fitted end to end to wall 27, so as to rotate about axis 23 and close cavity 29 to define a closed chamber for spring 30. As shown in FIG. 5, portion 21 also comprises a hinge pin 35 extending coaxially with axis 23 and integrally from an inner surface of end wall 33 towards frame 14, and engaging tubular wall 26 in rotary manner. The outer tubular wall 27 has a radial appendix 36, in which is formed an axial hole 37 parallel to and eccentric with respect to axis 23, and which can be aligned with a corresponding hole 38 formed through a radial extension of end wall 33.

With reference to FIG. 4, an intermediate portion 40 of lever 22 is fitted to a hinge pin 41, integral with frame 14, to rotate about an axis 43 parallel to axes 19 and 23, and is locked axially by a retaining ring 44 fitted to the end of pin 41 to keep portions 20 and 21 connected. The end 45 of lever 22 is connected by a joint 46 to the output member of an electric linear actuator 47, which is independent of the engine and, when disabled, has a travel resistance which is less than the force exerted by spring 30.

Starting from the FIG. 3 assembly condition of assembly 8, in which actuator 47 is disabled, and a retaining pin 49 (FIG. 3) is inserted inside holes 37 and 38 to load spring 30 and keep arm 15 and lever 22 in fixed relative angular positions, frame 14 is fixed to a fixed support 50 by means of two screws (not shown). At this point, pin 49 is extracted, and the loaded spring 30 rotates arm 15 clockwise in FIG. 3 to force drive wheel 16 against pulley 10 and against the back of the portion 5a of belt 5 extending about pulley 4, as shown in FIG. 1. In which position, power is transferred by assembly 8 from belt 5 to drive wheel 16, so that pump 7 pumps the engine cooling fluid.

When cooling of the combustion engine is not required, or is conveniently to be disabled, actuator 47 is operated, so that its output member withdraws to rotate lever 22 clockwise in opposition to the force of spring 30, and gradually move connecting portion 20 of arm 15 along a portion of a circle, coaxial with axis 43, to detach wheel 16 from pulley 10, while still keeping wheel 16 in contact with the back of portion 5a of belt 5, as shown in FIG. 2.

When actuator 47 is disabled, spring 30—by exerting greater force than the no-load resistance of actuator 47 at rest, and the resistance produced by sliding friction of the parts in relative movement—instantly moves wheel 16 back into contact with pulley 10, thus immediately restarting pump 7. Using an auxiliary drive wheel movable crosswise to its axis 19 of rotation by an independent actuator therefore enables pump 7 to be turned on/off as required by the temperature conditions of the engine, while pressure spring 30 ensures sufficient power transmission contact pressure between the parts in relative movement, and restores the contact pressure in the event of malfunctioning of the assembly—in particular, of actuator 47—to prevent overheating of the combustion engine.

Figure 8:
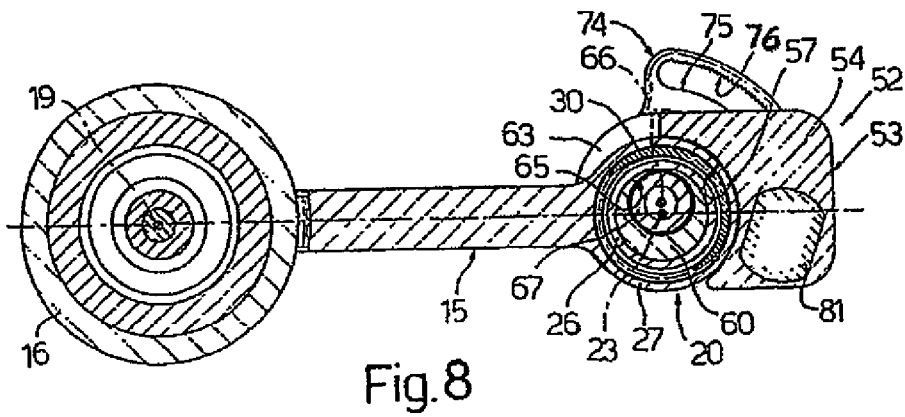
FIG. 8 shows a section along line VIII-VIII in FIG. 7.
Figure 7:
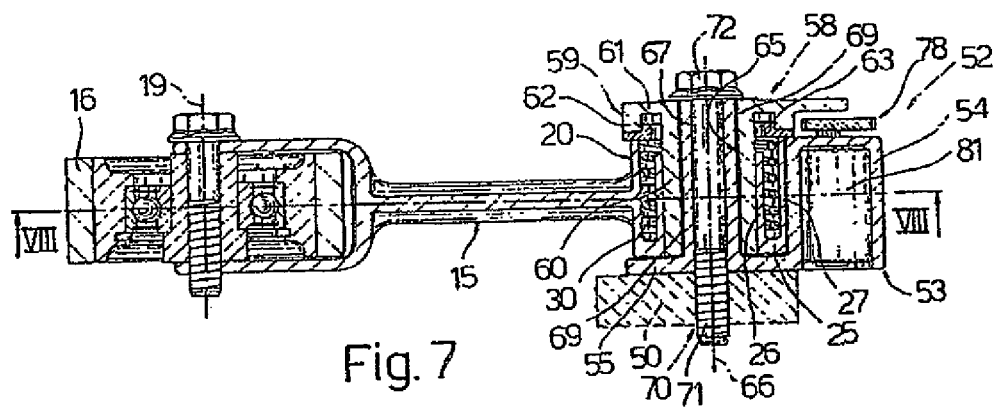
FIG. 7 shows a section along line VII-VII in FIG. 6.
Figure 6:
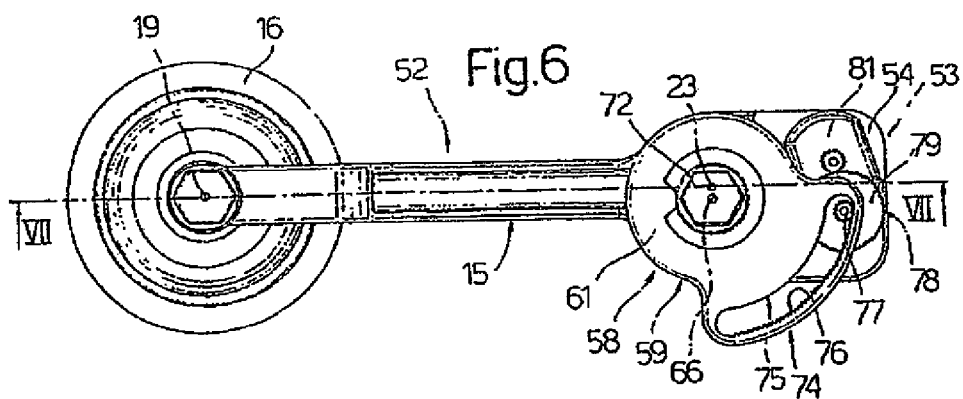
FIG. 6 shows a side view of a second preferred embodiment of the drive assembly according to the present invention.

The FIG. 6 to 8 embodiment relates to a drive assembly 52, which differs from assembly 8 as regards a number of construction details, and the component parts of which are indicated, where possible, using the same reference numbers as for the corresponding parts of assembly 8.

Figure 9:
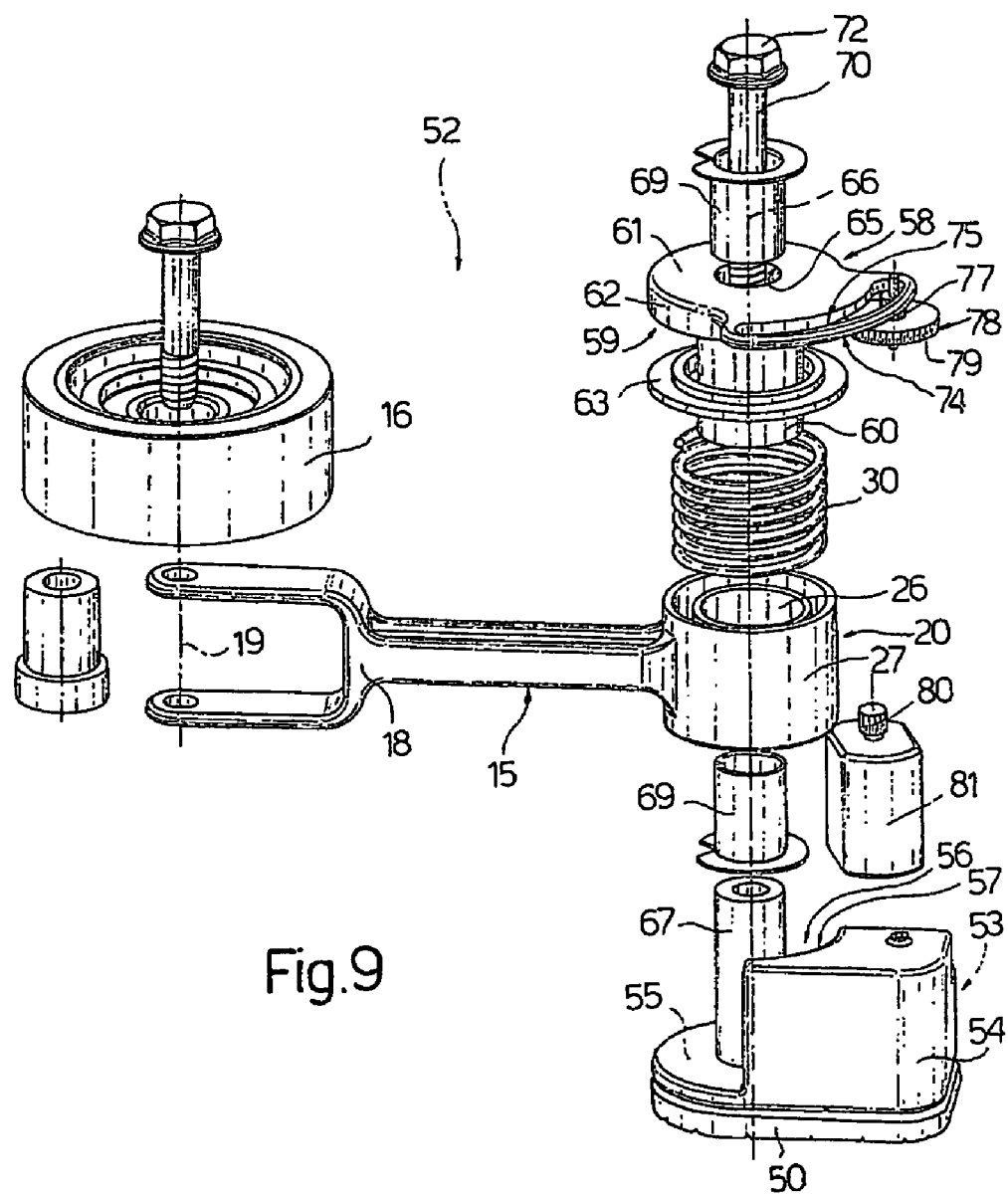
FIG. 9 shows an exploded view in perspective of the FIG. 6 drive assembly.

Assembly 52 has no rocker arm lever 22, and connecting portion 20 of arm 15 is fitted to a fixed frame 53, which differs from frame 14 by comprising a hollow housing portion 54, and a connecting plate 55 projecting from portion 54 and perpendicular to axis 23. On the side facing connecting plate 55, hollow portion 54 comprises a recess 56 (FIG. 9) bounded by a cylindrical surface 57, which extends coaxially with axis 23 and inside a dihedron with its vertex along axis 23 and an angle of about 150°, and has a radius longer than the outer radius of outer tubular wall 27, which, in this case, is longer than tubular wall 26.

Connecting portion 20 of arm 15 is located over connecting plate 55, is housed inside recess 56, coaxially with axis 23, and is connected to connecting plate 55 by a hinge-and-cam-actuating assembly 58 for moving connecting portion 20 to and from surface 57 along a circular trajectory. More specifically, assembly 58 comprises a hinge/actuating body 59 having a substantially T-shaped longitudinal section, and comprising a hinge pin 60, the outer cylindrical surface of which extends coaxially with axis 23 and through tubular wall 26. Body 59 also comprises a plate 61 integral with one end of hinge pin 60 and located on the opposite side of connecting portion 20 to plate 55. Plate 61 has an annular rib 62 facing connecting portion 20 and fitted to wall 27 of portion 20 with the interposition of a bush 63. Hinge pin 60 engages tubular wall 26 in rotary manner to enable connecting portion 20 to rotate in opposite directions about axis 23 with respect to frame a 53, and has an axial through hole 65 formed along an axis 66 parallel to and eccentric with respect to axis 23, and which is engaged in rotary manner by a hinge pin 67 integral with connecting plate 55 and facing surface 57. Two opposite oscillation-damping bushes 69 are interposed between the hinge pin 60 and the hinge pin 67.

Plate 61 comprises a radial appendix 74 having a curved slot 75 coaxial with eccentric axis 66. Slot 75 is bounded outwards by curved toothing 76 coaxial with eccentric axis 66, and houses a pinion 77 meshing with toothing 76. Pinion 77 and toothing 76 form part of a two stage reversible reduction gear drive 78, in turn forming part of assembly 58 and also comprising a gear 79 fitted to the same shaft as pinion 77 and meshing with a sprocket wheel 80 fitted to the output shaft of an electric motor 81 independent of combustion engine 1 and housed, adjacent to recess 56, inside portion 54.

Hinge pin 67 is hollow and fitted through with a screw 70, which is coaxial with axis 66, has a threaded end portion 71 engaging a threaded hole in fixed supporting body 50, and has a head 72 which presses on plate 61 to axially lock connecting portion 20.

Plate 61 comprises a radial appendix 74 having a curved slot 75 coaxial with eccentric axis 66. Slot 75 is bounded outwards by curved toothing 76 coaxial with eccentric axis 66, and houses a pinion 77 meshing with toothing 76. Pinion 77 and toothing 76 form part of a two stage reversible reduction gear drive 78, in turn forming part of assembly 58 and also comprising a gear 79 fitted to the same shaft as pinion 77 and meshing with a sprocket wheel 80 fitted to the output shaft of an electric motor 81 independent of combustion engine 1 and housed, adjacent to recess 56, inside portion 54.

In actual use, starting from the operating condition in which spring 30 presses wheel 16 against pulley 10 and the back of belt 5, operation of motor 81 rotates hinge pin 60 about eccentric axis 66, so that connecting portion 20 moves along a circular trajectory centered about axis 66, and wheel 16 is gradually withdrawn from pulley 10, while still being pushed against the back of belt 5, as described with reference to assembly 8. As in assembly 8, in the event of a malfunction or simply non-operation of motor 81, spring 30 of assembly 52 also overcomes the resistance of the motor, the gear drive, and the cam coupling, to push wheel 16 back into contact with both pulley 10 and the back of belt 5, thus starting pump 7 to cool the engine.

Assemblies 8 and 52 therefore provide, on the one hand, for transmitting power to pump 7 in exactly the same way as a direct belt drive, and, on the other, for enabling the cooling fluid to be cut off to allow the engine to reach steady running temperature fairly quickly, thus reducing pollutant emissions.

Assemblies 8 and 52 also ensure safe operation of the engine, by both automatically transmitting power, and so activating the pump, in the event of malfunctioning or difficulty in operating the electric actuators.

Forming the arm by joining two perfectly identical portions 15*a* makes for a modular arm which can be produced in one mold; and projections 15*c*, integral with the arms of fork-shaped portion B, enable wheel 16 to be assembled with no screws, and simultaneously with assembly of arm 15, thus saving considerable time and money.

Clearly, changes may be made to assemblies 8 and 52 as described herein without, however, departing from the scope of the present invention. In particular, drives other than those indicated by way of example may be provided between the linear actuator or electric motor and arm 15 supporting drive wheel 16. The linear actuator or electric motor itself may also be replaced by other, e.g. hydraulic, linear actuators/motors; and, as opposed to a friction wheel, wheel 16 may be an ordinary toothed wheel; in which case, the belt must be toothed at the back.

The invention claimed is:

1. A drive assembly (52) for driving a rotary member (10) of a pump (7) of a combustion engine (1); the assembly (8; 52) comprising:
    a movable supporting member (15);
    a drive wheel (16) fitted idly to said movable supporting member (15);
    elastic means (30) exerting a force on said movable supporting member (15) so that said drive wheel (16) drivingly contacting said rotary member (10) and a drive member (5) powered by said combustion engine (1) to drive the rotary member (10); and
    actuating means (81) provided to exert a force in opposition to that exerted by said elastic means (30) to detach said drive wheel (16) from at least one of said rotary member (10) and said drive member (5);
    said actuating means comprising a reversible electric rotary motor (81) such that a force exerted by said elastic means (30) to push said drive wheel (16) against said rotary member (10) and said drive member (5) being greater than the travel resistance of said actuating means (81) when maintained in a disabled rest condition;
    said actuating means (81) also comprising a mechanical drive interposed between an actuator (81) and said movable supporting member (15);
    said movable supporting member (15) comprising a connecting portion (20) disposed opposite to an end portion (18) supporting said drive wheel (16) and connected to said mechanical drive to move said supporting member (15) along a circular trajectory;
    said mechanical drive comprising a gear drive (78) interposed between said electric rotary motor (81) and said movable supporting member (15), and cam actuating means interposed between said gear drive (78) and said connecting portion (20);
    said connecting portion (20) being a hollow tubular portion having an axis of symmetry (23) parallel to the axis of rotation (19) of said drive wheel (16);
    said cam actuating means (59) comprising a first hinge pin (60) engaging said hollow tubular portion in rotary manner about said axis of symmetry (23) and hinged to a fixed frame (53) to rotate about a hinge axis (66) parallel to and eccentric with respect to the axis of symmetry (23);
    said actuating means (81) rotating said first hinge pin (60) about said hinge axis (66);
    said elastic means comprising a torsion spring (30) housed in the tubular said connecting portion (20) and having one end fixed angularly to said first hinge pin (60) and the opposite end fixed angularly to the tubular said connecting portion (20);
    said first hinge pin (60) being fitted integrally with a radial toothed portion (76) of said gear drive (78).

2. The drive assembly as claimed in claim 1, wherein said first hinge pin (60) terminates at one end with a radial appendix (74) having a curved slot (75) with its center of curvature coincident with said hinge axis (66); said toothed portion (76) facing inwards of said slot (75) and meshing with a pinion (77) movable inside the slot (75).

3. The drive assembly as claimed in claim 1, wherein said electric rotary motor (81) is housed in a cavity defined by said frame (53), and has an output shaft parallel to the hinge axis (66).

4. The drive assembly as claimed in claim 1, wherein said frame (53) is connected integrally to a fixed body (50) by a single through screw (70) extending coaxially with said hinge axis (66).

5. The drive assembly as claimed in claim 4, wherein said frame (53) has a recess (56) bounded by a cylindrical end surface (57) coaxial with said axis of symmetry (23); said connecting portion (20) being housed removably in said recess (56); and said first hinge pin (60) being connected in rotary manner to a second hinge pin (67) coaxial with the hinge axis (66) and integral with a supporting plate (55) of said frame (53).

6. The drive assembly as claimed in claim 1, wherein said movable supporting member comprises two contoured portions (15*a*) of the same shape and size.

7. The drive assembly as claimed in claim 6, wherein said contoured portions (15*a*) extend on opposite sides of a central plane of symmetry (P) of the drive wheel (16), which plane is perpendicular to the axis of rotation of said drive wheel.

8. The drive assembly as claimed in claim 7, wherein said contoured portions contact, and are connected integrally to, each other.

9. The drive assembly as claimed in claim 6, wherein said contoured portions (15*a*) are made of molded plastic material.

10. The drive assembly as claimed in claim 6, wherein the contoured portions define at least one end fork having respective arms (15*b*); each arm having a respective integral cylindrical projection (15*c*) forming part of a hinge pin coaxial with a relative axis (A), and to which the drive wheel (16) is mounted to rotate about the relative axis (A).

11. The drive assembly as claimed in claim 1, wherein said gear drive is in the form of a two stage reversible reduction gear drive (78) comprising a pinion (77), a gear (79) non-rotatably coupled to and coaxial with said pinion (77), and said toothed portion (76) of said cam actuating means (59) meshing with said pinion (77); and wherein said gear (79) is in mesh with a sprocket wheel (80) drivingly coupled to said electric rotary motor (81).

* * * * *

UNITED STATES PATENT AND TRADEMARK OFFICE
CERTIFICATE OF CORRECTION

PATENT NO. : 7,918,758 B2  
APPLICATION NO. : 10/551089  
DATED : April 5, 2011  
INVENTOR(S) : Tommaso Di Giacomo and Heinz Lemberger It is certified that error appears in the above-identified patent and that said Letters Patent is hereby corrected as shown below:

Title page, item [73], the Assignee should be listed as  
DAYCO EUROPE S.R.L., Chieti (IT)  
BAYERISCHE MOTOREN WERKE AKTIENGESELLSCHAFT, Munich (DE)

Signed and Sealed this  
Thirty-first Day of January, 2012

David J. Kappos  
*Director of the United States Patent and Trademark Office*